United States Patent [19]

Persiani

[11] Patent Number: 4,580,182
[45] Date of Patent: Apr. 1, 1986

[54] MECHANICAL DEVICE FOR STOPPING THE MAGNETIC CASSETTE DURING EJECTION FROM CASSETTE PLAYERS AND RECORDERS

[75] Inventor: Luigi Persiani, Osimo, Italy

[73] Assignee: Societa "Lenco Italia"-S.p.A., Via del Guazzatore, Italy

[21] Appl. No.: 556,933

[22] Filed: Dec. 1, 1983

[30] Foreign Application Priority Data

Dec. 2, 1982 [IT] Italy ................... 643 A/82

[51] Int. Cl.⁴ ...................... G11B 15/00; G11B 23/02
[52] U.S. Cl. .................................. 360/93; 360/96.5; 360/132
[58] Field of Search ................ 360/96.5, 96.6, 93, 360/96.1, 132, 137; 242/197–199

[56] References Cited

U.S. PATENT DOCUMENTS 3,863,267  1/1975  Yasukatsu ..................... 360/93
4,071,858  1/1978  Ejiri ............................ 360/93

*Primary Examiner*—Stuart N. Hecker
*Assistant Examiner*—Benjamin E. Urcia
*Attorney, Agent, or Firm*—Leonard Bloom

[57] ABSTRACT

A latch member permits the cassette of a player-recorder from being ejected completely, once the ejection lever is released. Thereafter, the cassette may be pulled out of the player-recorder. The latch member may flex to accommodate insertion and seating of the cassette within the player-recorder. A projection on the latch member is received in a notch on the ejection lever, which is biased by a spring.

4 Claims, 7 Drawing Figures

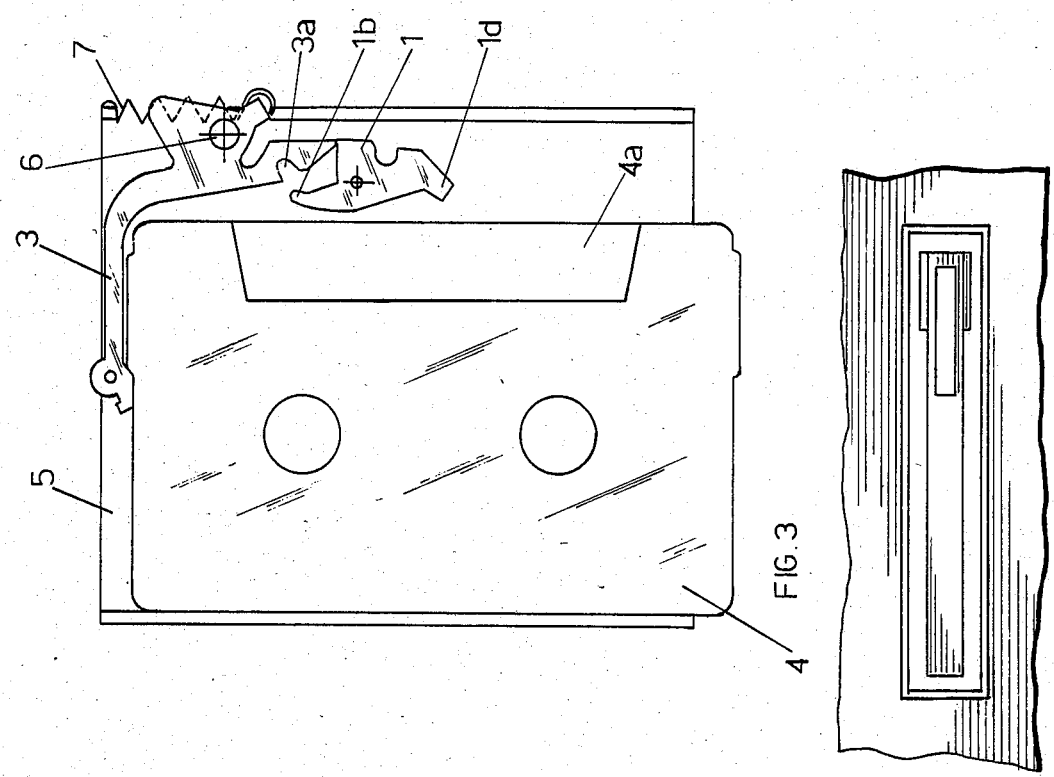
FIG. 3
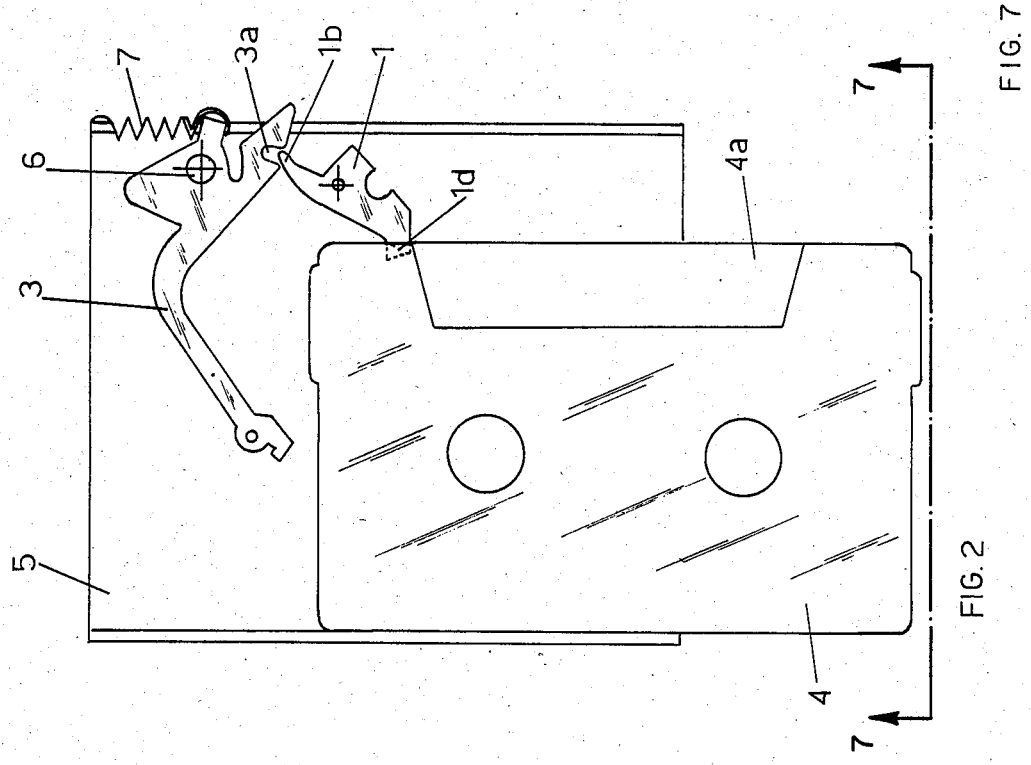
FIG. 2
FIG. 7

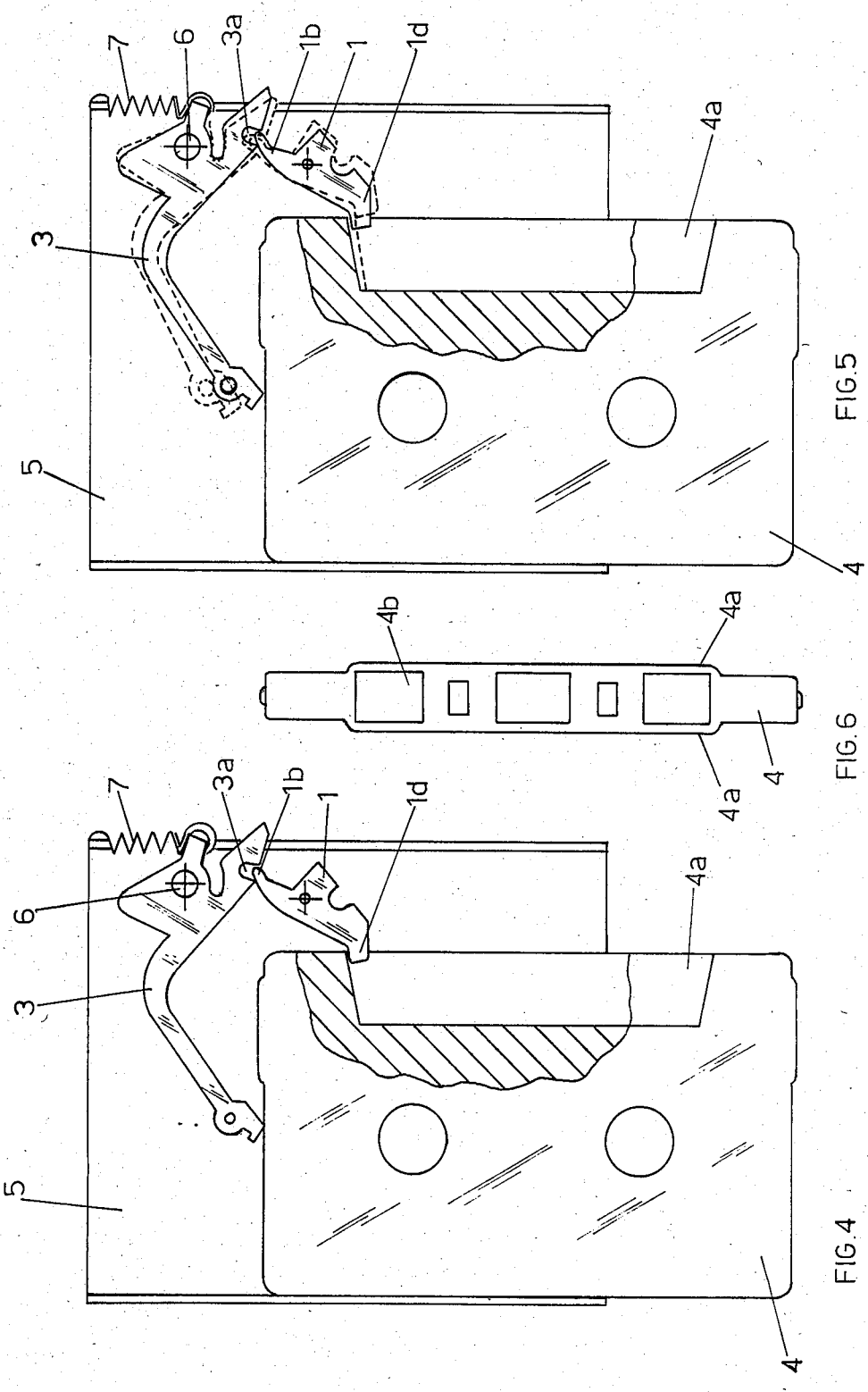

MECHANICAL DEVICE FOR STOPPING THE MAGNETIC CASSETTE DURING EJECTION FROM CASSETTE PLAYERS AND RECORDERS

FIELD OF THE INVENTION

This invention pertains to an improvement on a cassette player and/or recorder which instantly stops a magnetic cassette during its ejection from those cassette players and/or recorders where the cassette is inserted longitudinally into a slotted window provided on the front of the set.

BACKGROUND OF THE INVENTION

At the present time, certain cassette players and/or recorders have front portions which are provided with a slotted window for the longitudinal insertion of a magnetic cassette. The mechanisms which are employed in these player-recorders for releasing the cassette, yet precluding a complete ejection of the cassette out of the player-recorder, are relatively complex, costly to manufacture, and somewhat unreliable in their operation.

Accordingly, there remains a need to provide a device which can preclude the complete ejection of a magnetic cassette (upon the release thereof) and which can be produced economically for relatively long-life reliable performance.

SUMMARY OF THE INVENTION

Accordingly, an improved device is provided which is very simple (both structurally and kinematically) and which may be manufactured economically for repeated reliable usage.

It is an object of the present invention to provide a latch member which, acting in combination with an improvement to the ejection layer, is designed to catch hold of the cassette during ejection and, which, although initially obstructing the cassette as it is being inserted, yields to the opposing force and flexes, thus allowing the insertion of the complete cassette.

It is another object of the present invention to provide a latch member, preferably of varying rigidity, which flexes on contact with the cassette being inserted, and which cooperates with an improved ejection lever, thereby eliminating the complex and costly mechanisms presently employed.

The present invention finds particular utility in conjunction with a cassette player-recorder having a window for receiving a cassette, wherein the window is slotted longitudinally of the player-recorder, and wherein the cassette is substantially rectangular in plan outline and has at least one longitudinal rib along one side thereof. This longitudinal rib terminates short of the end of the cassette to thereby define a shoulder. The cassette further has at least one opening formed therein, and the opening is defined by an end wall located substantially above the shoulder on the rib.

In accordance with the teachings of the present invention, an ejection lever is pivotably mounted on the player-recorder about a first axis substantially perpendicular to the plane of longitudinal movement of the cassette within the player-recorder. Resilient means are provided to constantly urge the ejection lever in one pivotable direction. A latch member is pivotably mounted on the player-recorder about a second axis substantially parallel to the first axis. The latch member has a projection formed thereon, and the ejection lever has a recess means adapted to receive the projection; and the latch member further has a tooth formed thereon, substantially opposite to the projection.

When the cassette is slidably received through the window on the player-recorder, the shoulder on the rib of the cassette engages the tooth on the latch member, thereby causing the latch member to flex sufficiently to ride under the rib, until the end of the cassette engages the ejection lever, thereby pivoting the ejection lever in a direction opposite to the one direction and against the force of the resilient means. The recess means on the ejection lever engages the projection on the latch member, thereby pivoting the latch member away from the cassette, and thereby allowing the cassette to drop down into its fully seated position within the player-recorder.

When the ejection lever is activated, the force of the resilient means causes the ejection lever to pivot in the one direction to eject the cassette out of the player-recorder. The recess means on the ejection lever engages the projection on the latch member and pivots the latch member, so that the tooth on the latch member engages the end wall of the opening on the cassette, thereby precluding the complete ejection of the cassette from the player-recorder. The cassette may be pulled out of the player-recorder, such that the latch member pivots sufficiently to clear the tooth from the opening on the cassette.

In accordance with the further teachings of the present invention, the latch member comprises a thin flexible member, molded of plastic, and having a varying rigidity. The latch member has a relatively rigid central area pivotably mounted on the player-recorder. This projection comprises a curved tip which is received in the recess means in the ejection lever. The latch member further has an outwardly tapered portion, substantially opposite to the curved tip running from the central portion and terminating in the tooth on the latch member. Preferably, the recess means on the ejection lever comprises a notch for receiving the curved tip on the latch member.

These and other objects of the present invention will become apparent from a reading of the following specification, taken in conjunction with the enclosed drawings.

BRIEF DESCRIPTIOFN OF THE DRAWINGS

FIG. 2 illustrates the position of the latch member and the ejection lever while the cassette is being inserted.

FIG. 3 illustrates the position of the latch member and the ejection lever after the complete insertion of the cassette and during playing.

FIG. 4 illustrates the position of the latch member and the ejection lever during the stopping phase of the cassette in the process of being ejected from the player-recorder.

FIG. 5 illustrates the position of the latch member and the ejection lever during the extraction of the cassette.

FIG. 6 is a view of the front edge of a normal magnetic cassette according to this invention.

FIG. 7 is a front view of a cassette player and/or recorder taken across lines 7—7 of FIG. 2, and showing the magnetic cassette being slidably inserted longitudinally into a slotted window formed in the player-recorder.

DESCRIPTION OF THE PREFERRED EMBODIMENTS

Figure 1:
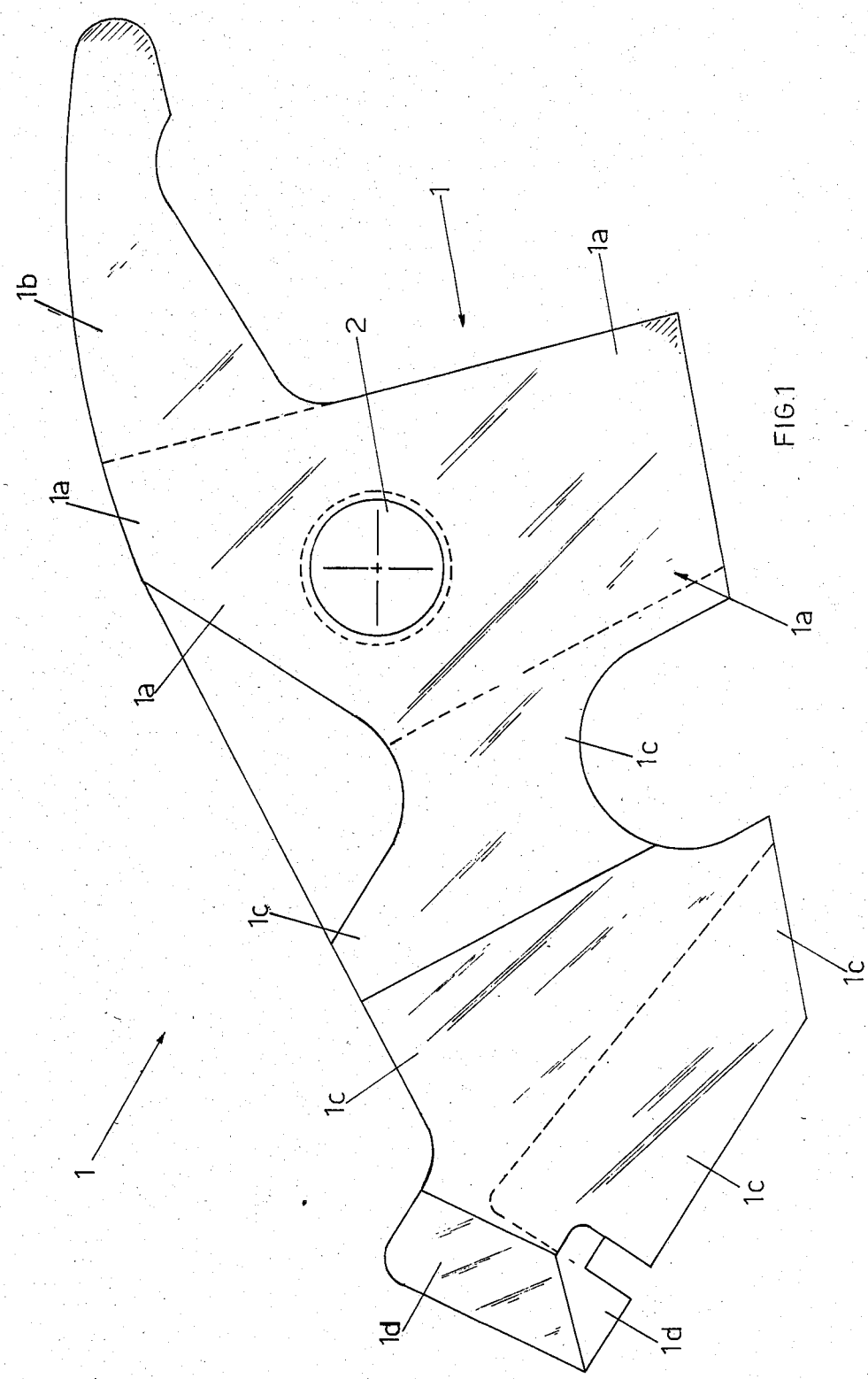
FIG. 1 is a plan view, drawn to an enlarged scale, of a preferred embodiment of the latch member of the present invention.

With reference to FIG. 1, the preferred embodiment of the latch member 1 is shown. The latch member is a relatively-thin suitably-shaped lamina or member, preferably molded of plastic, although other materials may be used. This latch member is of varying rigidity and has a relatively-rigid indeformable central area 1a, which is preferably roughly rectangular in shape and is pivotably mounted on the player/recorder on an axis 2 substantially perpendicular to the plane of the longitudinal movement of the cassette within the player/recorder. This axis 2 provides a fulcrum for the latch member 1, and it will be understood that this pivot axis may be provided by means of a pin.

From this central area 1a of the latch member, a slightly thicker projection 1b protrudes which, in the preferred embodiment of this invention, is provided with a curved tip.

On the opposite side of the projection 1b, a thinner, flexible area 1c protrudes from the central area 1a of the latch member. This thinner, flexible area tapers outwardly and ends in a small blunt tooth 1d hving slanting edges.

In the preferred embodiment of the latch member (as shown in FIG. 1), the broken lines indicate the differences in thickness between the respective areas of the latch member.

With reference to FIGS. 2-5, the cooperative operation between the latch member 1, ejection lever 3, magnetic cassette 4, and the longitudinal track 5 within the player/recorder have been illustrated. The remaining structural details and mechanisms of an everyday cassette player-recorder are well known and have been omitted for ease of illustration.

With reference to FIG. 2, when the magnetic cassette 4 is inserted into the playing track 5, the cassette is initially guided by appropriately placed projections and passes over and just touches the tooth 1d of the latch member. Immediately afterwards, however, the tooth comes sharply into contact with the flat rib 4a provided on the edge and both of the sides of the cassette. Meeting this resistance, the tooth 1d yields, flexing downwards and deforming the whole thinner area 1c of the latch member 1. The tooth has been blunted in order to facilitate and ensure its flexing action, thus eliminating any danger of the cassette stopping and jamming against the tooth during insertion of the cassette therein.

As the insertion of the cassette continues into the track 5, the cassette engages the ejection lever 3, causing the ejection lever to retract and to pivot (in a clockwise direction as viewed in FIG. 2) under the force of the advancing cassette.

The rotation of the ejection lever 3 about a first axis, which is substantially perpendicular to the plane of longitudinal movement of the player-recorder, brings about the progressive and complete retraction of the tooth 1d of the latch member from the pathway of the track 5. This is accomplished by a recess means on the ejection lever and adapted to receive the projection 1b on the latch member. In the preferred embodiment, this recess means is a notch 3a formed on the edge of the ejection lever. When the notch 3a on the ejection lever engages the projection 1b on the latch member, the latch member is pivoted away from the cassette, thereby allowing the cassette to drop down into its fully seated position within the player-recorder (as shown in FIG. 3). To achieve this result, the tooth 1d on the latch member is retracted away from the track, thereby allowing the cassette to be lowered into playing position.

With reference to FIG. 3, in comparison to FIG. 2, the projection 1b on the latch member 1 has been removed from the notch 3a on the ejection lever 3, and the latch member 1 has pivoted counterclockwise (as viewed in FIG. 3) so that the tooth 1d on the latch member 1 is clear of the track 5.

These player-recorders (as will be appreciated by those skilled in the art) employ a conventional mechanism (not shown herein) to lower the cassette into its playing position simultaneously with the advance of the playing head.

With refernce to FIG. 4, the ejection lever has been activated (or otherwise released) to eject the cassette from the player-recorder. As the cassette is being ejected, following the raising of the cassette and the stopping of the playing head, the tip of the projection 1b is engaged in the recess 3a of the ejection lever 3. The ejection lever 3 is urged by the resilient means (which in the preferred embodiment is a spring 7) to rotate the latch member 1, thus causing the tooth 1d to jut out into the track 5 just in time to engage the end wall of the opening 4b of the cassette 4, thereby immediately stopping the cassette from being completely ejected out of the player-recorder.

Thereafter, the complete removal of the cassette merely requires a slight force to be exerted by the user, such that the tooth 1d is pushed out of the track 5 by the end wall of the opening 4b, thereby rotating the latch member 1 out of the way. The latch member 1 in turn rotates the ejection lever 3 since the projection 1b is in engagement with the recess 3a in the ejection lever.

In this last phase of ejection and removal of the cassette, the spring 7 exerts a bias force on the ejection lever, which is transmitted to the latch member (because the curved tip on the latch member is received in the notch on the ejection lever).

While the preferred embodiment of the invention has thus been illustrated and described, it is to be understood that such showing and description have been offered by way of example and not limitation. Variations will be apparent to one skilled in the art without departing from the principles described herein. Accordingly, the invention is not to be limited to the specific embodiment illustrated. Protection by Letters Patent of this invention, in all its aspects as the same are set forth in the appended claims, is sought to the broadest extent that the prior art allows.

I claim:

1. In a cassette player-recorder having a window for receiving a cassette, slotted longitudinally of the player-recorder, wherein the cassette is substantially rectangular in plan outline and has at least one longitudinal rib along one side thereof, the rib terminating short of the end of the cassette to thereby define a shoulder, the cassette further having at least one opening formed therein, the opening being defined by an end wall located substantially above the shoulder on the rib, the improvement which comprises, in combination, an ejection lever pivotably mounted on the player-recorder about a first axis substantially perpendicular to the plane of the longitudinal movement of the cassette within the player-recorder, resilient means constantly urging the ejection lever in one pivotable direction, a latch member pivotably mounted on the player-recorder about a second axis substantially parallel to the first axis, a projection on the latch member, the ejection lever having a recess means adapted to receive the projection, and a tooth on the said latch member substantially opposite to the projection thereon, whereby when the cassette is slidably received through the window on the player-recorder, the shoulder on the rib of the cassette engages the tooth on the latch member, thereby causing the latch member to flex sufficiently to ride under the rib, until the end of the cassette engages the ejection lever, thereby pivoting the ejection lever in a direction opposite to the said one direction and against the force of the resilient means, whereby the recess means on the ejection lever engages the projection on the latch member, thereby pivoting the latch member away from the cassette, and thereby allowing the cassette to drop down into its fully seated position within the player-recorder, and whereby when the ejection lever is activated, the force of the resilient means causes the ejection lever to pivot in the said one direction to eject the cassette out of the player-recorder, whereby the recess means on the ejection lever engages the projection on the latch member and pivots the latch member so that the tooth on the latch member engages the end wall of the opening on the cassette, thereby precluding the complete ejection of the cassette from the player-recorder, and wherein the cassette may be pulled out of the player-recorder so that the latch member may be pivoted sufficient to clear the tooth from the opening on the cassette.

2. The improvement of claim 1, wherein the latch member comprises a thin flexible member, molded of plastic, and having a varying rigidity.

3. The improvement of claim 2, wherein the latch member has a relatively rigid central area pivotably mounted on the player-recorder, wherein the projection comprises a curved tip on the latch member and adapted to be received in the recess means in the ejection lever, and wherein the latch member further has an outwardly tapered portion, substantially opposite to the curved tip, running from the central portion and terminating in the tooth on the latch member.

4. The improvement of claim 3, wherein the recess means on the ejection lever comprises a notch formed on an edge of the ejection lever.

* * * * *